United States Patent [19]

Haller

[11] Patent Number: 5,722,503

[45] Date of Patent: Mar. 3, 1998

[54] BOUNDARY RESPONSIVE MOBILITY APPARATUS

[76] Inventor: William R. Haller, 425 Brighton St #403, Bethlehem, Pa. 18015

[21] Appl. No.: 818,280

[22] Filed: Mar. 17, 1997

Related U.S. Application Data

[63] Continuation of Ser. No. 312,883, Sep. 27, 1994, abandoned.

[51] Int. Cl.[6] ........................... B60T 7/16
[52] U.S. Cl. ............... 180/168; 280/33.994; 280/87.051; 188/5
[58] Field of Search ................... 280/33.994, 87.05, 280/87.051, 647, 648, 650, 43.14, 43.17, 43.24, 47.38; 180/168; 88/5, 111

[56] References Cited

U.S. PATENT DOCUMENTS

| | | | |
|---|---|---|---|
| 2,236,281 | 3/1941 | Anderson | 188/5 |
| 2,922,494 | 1/1960 | Clark, Jr. | 188/5 |
| 2,964,140 | 12/1960 | Berezny | 280/33.994 |
| 3,117,655 | 1/1964 | Skupas et al. | 280/33.994 |
| 3,495,688 | 2/1970 | Isaacks | 280/33.994 |
| 3,554,328 | 1/1971 | Jones | 188/5 |
| 3,652,103 | 3/1972 | Higgs | 280/33.994 |
| 3,712,426 | 1/1973 | Gilbrech | 188/164 |
| 3,715,015 | 2/1973 | Morris | 188/5 |
| 4,226,413 | 10/1980 | Daugherty | 272/70.4 |
| 4,577,880 | 3/1986 | Bianco | 280/33.994 |
| 4,579,359 | 4/1986 | Schwartz | 280/87.02 |
| 4,591,175 | 5/1986 | Upton et al. | 280/33.994 |
| 4,609,075 | 9/1986 | Snedecker | 280/33.994 |
| 4,699,392 | 10/1987 | Ku | 280/87.051 |
| 4,844,209 | 7/1989 | Sedlack | 188/5 |
| 4,987,978 | 1/1991 | Jungersen | 188/2 F |
| 5,121,018 | 6/1992 | Oldakowski | 310/77 |
| 5,197,750 | 3/1993 | Di George | 280/250.1 |
| 5,315,290 | 5/1994 | Moreno et al. | 280/33.994 |
| 5,366,231 | 11/1994 | Hung | 280/87.051 |

Primary Examiner—Brian L. Johnson
Assistant Examiner—Frank Vanaman

[57] ABSTRACT

A conventionally constructed baby walker 5 having a lower support member 6 to which are attached front wheels 10 and 11 (not shown) and rear wheels and 12 and 13 (not shown) in contact with floor surface 14 has further magnetically activated brake assembly 21 moveably attached to support member 6, the bottom surface of which is also in contact with floor surface 14. Brake assembly 21 further contains a permanent magnet disposed above surface 14 and attached to an internal latching mechanism. A magnetically permeable arc shaped strip 15 is further attached to floor surface 14 using conventional screws 19. Preferably strip 15 is placed in front of staircase 20 or other level drop such as may be encountered with a patio or porch. As walker 5 is propelled across surface 14 and over strip 15, the permanent magnet is downwardly attracted to the permeable strip releasing the latching mechanism and engaging brake assembly 21. With brake assembly 21 engaged, the frictional contact between surface 14 and the bottom surface of brake assembly 21 is forceably increased arresting walker 5. An audible alarm contained within brake assembly 21 is additionally energized alerting attending personnel.

2 Claims, 5 Drawing Sheets

BOUNDARY RESPONSIVE MOBILITY APPARATUS

This application is a continuation of application Ser. No. 08/312,883 filed 27 Sep. 1994 and now abandoned.

FIELD OF INVENTION

This invention relates generally to mobility devices and more particularly, to assistive mobility devices such as upright walkers, baby walkers and wheelchairs.

BACKGROUND OF THE INVENTION

All mobility divices have the potential of being unintentionally propelled down a flight of steps usually resulting in serious injury to the user. This is especially true of curious infants who are not capable of discerning the potential danger of an unprotected staircase. To impact the seriousness of this problem, it was recently reported to the Consumer Products Safety Commission of the U.S. Department of Commerce that as many as 28,900 children are admitted in hospital emergency rooms with walker associated injuries, with over 81% of the walker associated injuries resulting from incidents in which the child and walker fell down a flight of steps, off a porch or patio, or between floor levels. Additionally, many mobile toys have the same potential of being propelled down an open staircase. Further, adults using wheelchairs or upright walkers face similar risks of receiving serious injury by unintentionally falling down a staircase.

Past inventions have concentrated on providing manually operated braking systems for both walkers and wheelchairs. For example, U.S. Pat. No. 4,226,413 issued to Daugherty discloses a wheel mounted walker for supporting a person in the upright position having a foot pedal actuated brake. To engage the brake requires the supported person to manually depress a foot pedal.

U.S. Pat. No. 4,579,359 issued to Schwartz discloses a safety brake for a self propelled baby walker. However, this braking system is intended to be manually operated and does not provide for an automatic means to engage the brake if the baby walker approaches a potentially dangerous staircase.

Further, U.S. Pat. No. 4,844,209 issued to Sedlack sets forth a safety brake for baby walkers with a single touch actuation. To engage the brake and arrest the walker, a latch mechanism has to be manually released. Again, no means is provided to automatically engage the brake if the occupied baby walker approaches a staircase.

U.S. Pat. No. 4,987,978 issued to Jungersen discloses a safety brake mechanism for wheelchairs to brake the wheelchair and prevent rollback when the user changes position of the hands while ascending an incline. The braking mechanism must again be manually engaged and no automatic means is provided to arrest the wheelchair as it approaches a staircase.

While the foregoing described prior art have, with varying degrees of success, attempted to provide assistive mobility devices with braking mechanisms, none of the prior art discloses an assistive mobility apparatus which automatically arrests as it approaches a potentially dangerous staircase. Thus there remains a need in the art for a simple and inexpensive assistive mobility apparatus which automatically arrests in front of a staircase thus preventing serious injury to the user.

SUMMARY OF THE INVENTION

The invention provides an improved assistive mobility apparatus, the improvement comprising a magnetically actuated brake assembly moveably attached to the lower frame of the mobility device and a magnetically permeable strip placed in front of the staircase. When the mobility apparatus rolls over the permeable strip, the brake assembly is automatically activated and prevents any further motion of the apparatus.

The brake assembly consists of an outer cylindrically shaped housing. A substantially solid wall partitions the interior of the housing into an upper and lower chamber. The upper chamber contains an audible alarm, battery and switch all electrically connected into a series circuit. The lower chamber contains a slideable piston. A compressible spring is disposed between the upper end of the piston and the partition wall of the housing.

With the brake disengaged, the piston is retracted into the lower chamber which also compresses the spring. A releaseable latching mechanism locks the piston in this position and prevents further vertical piston movement. A permanent magnet is further moveably enclosed within the interior portion of the piston and is connected to the latching mechanism. Additionally, the locked piston opens the switch in the upper chamber and deenergizies the audible alarm.

As the mobility apparatus rolls over the permeable strip, the bottom end of the brake assembly slides up and over the top of the strip. The magnet is pulled downwardly to the top of the strip by the magnetic lines of force and releases the latching mechanism holding the piston. The piston is now free to move in a vertically downward direction. The force of the compressed spring then forceably extends the piston outwardly from the bottom of the housing. The brake is now engaged having the bottom surface of the piston now forceably coming into frictional contact with the top floor surface and lifting the mobility apparatus off of the floor surface thus arresting the mobility apparatus. Further, the extended piston closes the switch in the upper chamber connecting the battery to the audible alarm thereby sounding the alarm and alerting anyone in close proximity.

OBJECTS OF THE INVENTION

It is therefore an object of the invention to provide an improved mobility apparatus which automatically arrests as the mobility apparatus rolls over a boundary strip.

It is another object of the invention to provide an improved mobility apparatus for automatically stopping in front of an open staircase.

It is yet a further object of the invention to provide a magnetically activated brake assembly responsive to a magnetically permeable strip placed in front of an open staircase for preventing mobility devices from being propelled down stairs.

It is yet still a further object of the invention to provide a magnetically activated brake assembly having an audible alarm for alerting adults of an imminent danger to a child's safety.

It is yet another further object of the invention to provide an inexpensive and easily manufactured brake assembly for preventing mobility apparatus from being inadvertently propelled down an open staircase.

It is yet another object of the invention to provide a wheel assembly for controlling the rolling movement of a mobility apparatus.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
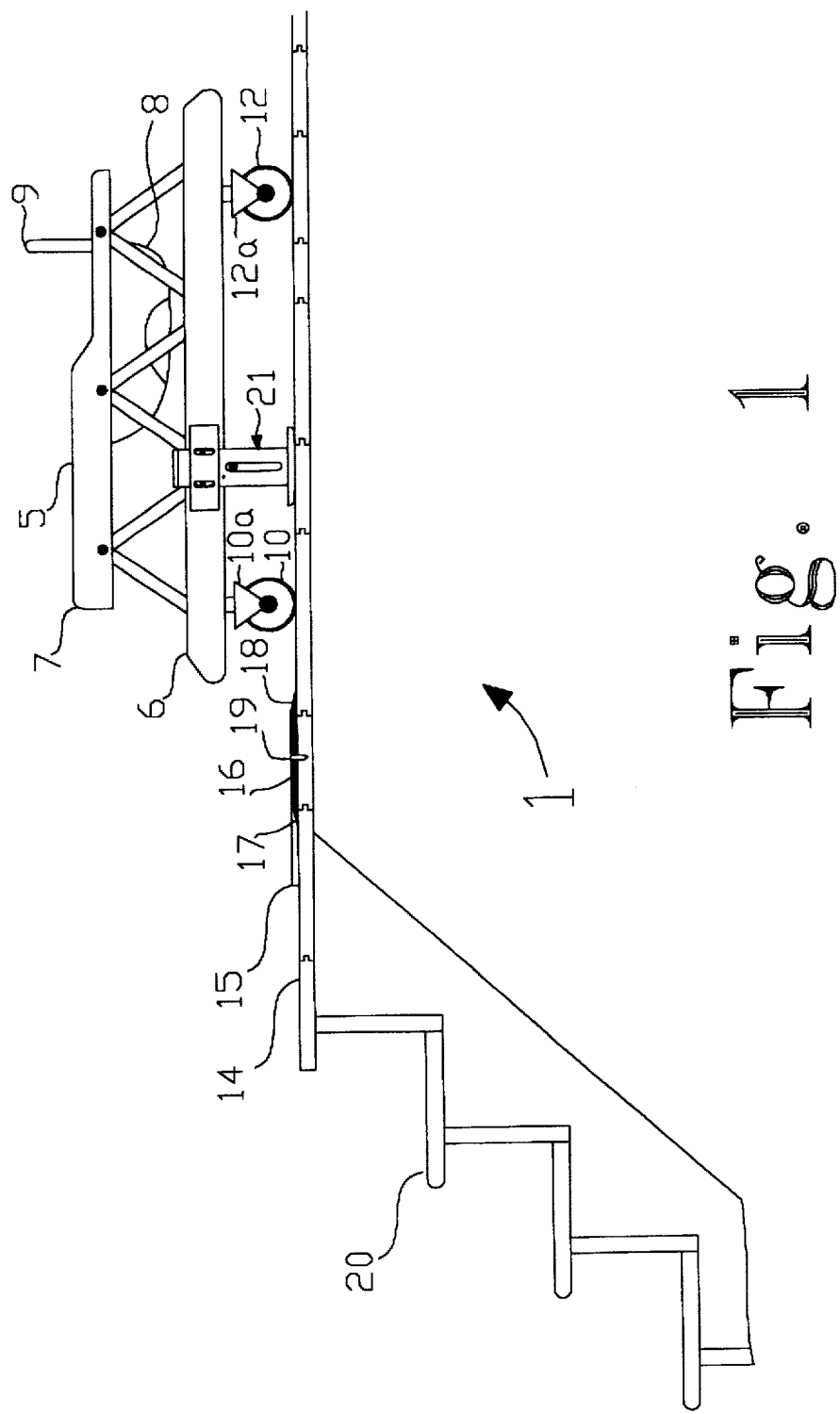
FIG. 1 illustrates a side view of an embodiment of the invention placed on a floor surface and in front of a set of stairs.

Referring now to FIG. 1 of the drawings, there is shown a preferred embodiment 1 of the invention having a conventionally constructed baby walker 5 having a lower support member 6.

Upper support member 7 connects to and is vertically positioned over lower support member 6. Support member 7 further contains seat 8 and an integral backrest support 9 to support the occupant of walker 5. Additionally, brake assembly 21 is moveably attached to support member 6 and in contact with tongue and groove floor surface 14.

Rotatably attached to support member 6 are front wheel support assemblies 10a and 11a (not shown) and rear wheel support assemblies 12a and 13a (not shown). Front wheels 10 and 11 (not shown) and rear wheels 12 and 13 (not shown) are rollably attached to their respective wheel support assemblies 10a, 11a, 12a, and 13a. Further, wheels 10–13 are in contact with floor surface 14.

Wheels 10, 11, 12, and 13 and respective rotatable wheel support assemblies 10a, 11a, 12a, and 13a enable walker 5 to move unobstructively in all directions on floor surface 14 with a minimum amount of friction. Thus, a baby properly placed within walker 5 is able to easily propel him or herself and traverse floor surface 14 in all directions.

A magnetically permeable arc shaped strip 15 having respectively inside and outside beveled edges 17 and 18 is further attached to floor surface 14 using conventional screws 19. Strip 15 could also be attached to a smooth floor surface using conventional double sided tape or could also be placed either underneath or on top of a carpet covering floor surface 14. Preferably strip 15 is placed in front of staircase 20 or other level drop such as may be encountered with a patio or porch.

Beveled edges 17 and 18 provide for a smooth transition from floor surface 14 to top surface 16 of strip 15 thereby allowing brake assembly 21 to smoothly ascend from the floor surface 14 to top 16 of strip 15 as walker 5 is propelled across strip 15 and also minimally hinders normal walking across strip 15.

Figure 2:
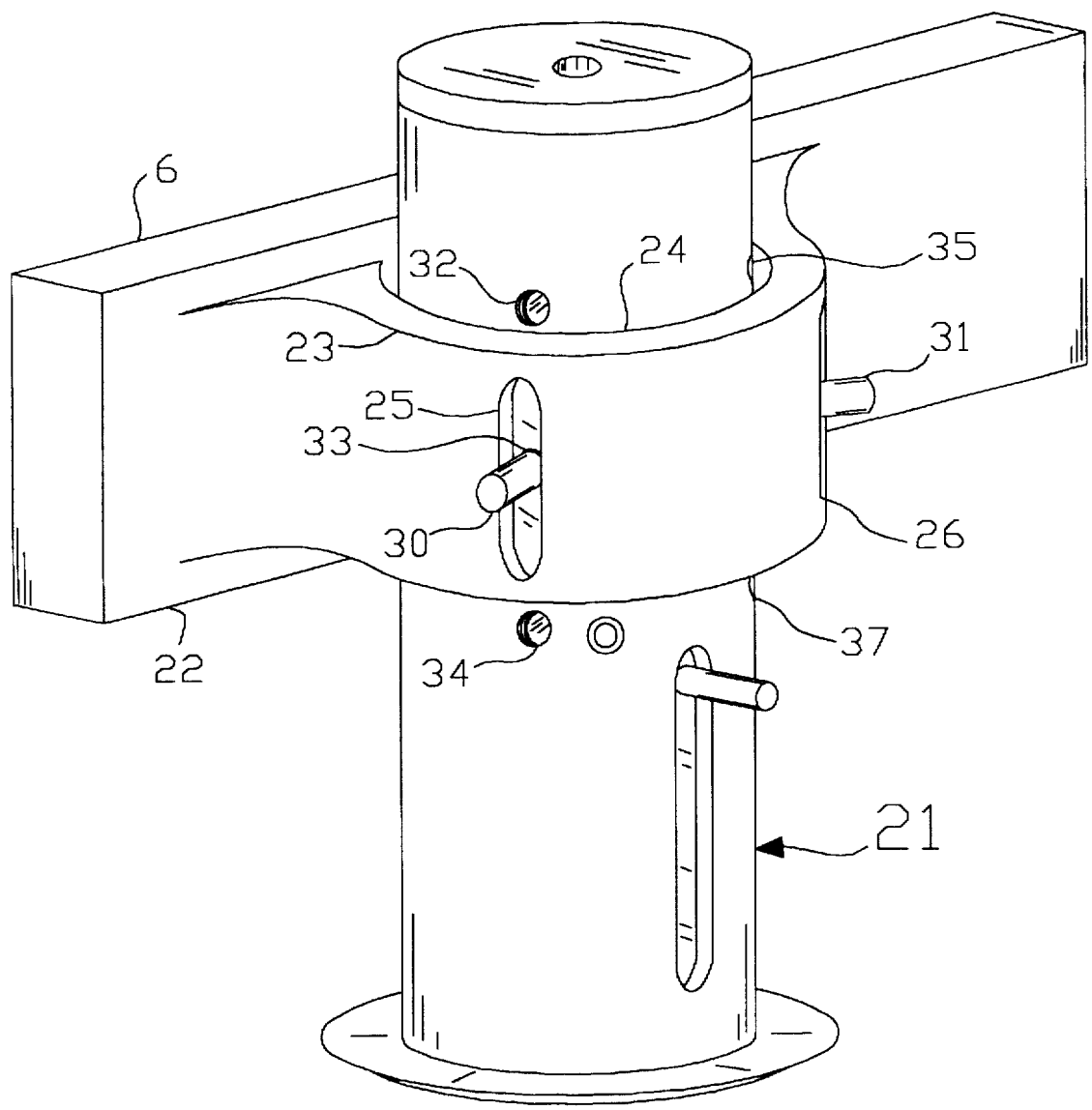
FIG. 2 illustrates a perspective view of a magnetically activated brake assembly moveably attached to a lower support member of an embodiment of the invention.

Referring additionally now to FIG. 2, support member 6 has further formed on outside edge 22 a cylindrical shaped bracket 23. The diameter of cylindrically shaped inside surface 24 of bracket 23 is larger than the diameter of the upper portion of brake assembly 21 allowing free vertical movement of brake assembly 21 within bracket 23. Further formed on bracket 23 are vertically disposed slots 25 and 26.

Formed on the upper outside surface of brake assembly 21 are two vertically disposed duplicate rows of equidistantly spaced tapped holes respectively consisting for the first row holes 32, 33, and 34, and for the second row holes 35, 36 (not shown), and 37. Both rows of holes are vertically equidistantly located from the bottom end of brake assembly 21. Additionally the radial position of both the first and second rows of holes further align with the radial position respectively of slots 25 and 26.

Threaded alignment pins 30 and 31 are inserted respectively through slots 25 and 26. Pin 30 then threads into one of the holes 32, 33 or 34 of the first row and pin 31 threads into one of the corresponding holes 35, 36 or 37 of the second row.

Alignment pins 30 and 31 when threaded into a respective corresponding hole pair of the first and second rows of holes adjust the nominal vertical position of brake assembly 21 relative to support member 6. This adjustment of a nominal vertical position of brake assembly 21 relative to support member provides for an initial height adjustment of brake assembly 21 to assure that the bottom surface of brake assembly 21 is maintained in contact with floor surface 14 and does not obstructively hinder normal rolling ability of walker 5. Preferably, brake assembly 21 is positioned within bracket 23 such that pins 30 and 31 are positioned within the middle portion of respective slots 25 and 26.

With this adjustment made, brake assembly 21 is able to freely move within a predefined vertical distance range about this nominal vertical position determined by the relative position of alignment pins 30 and 31 with respect to slots 25 and 26.

Thus, as walker 5 passes over strip 15 brake assembly 21 can freely rise in a vertical position to transcend either beveled edges 17 and 18 without obstructing the normal horizontal motion of walker 5. Further, any variations in the height of floor surface 14, as might be encountered for example, with a floor partially covered with a rug, will not hinder brake assembly 21 from gliding smoothly over the entire floor surface 14 continuing the normal motion of walker 5 while still maintaining the bottom end of brake assembly 21 contact with floor surface 14.

Figure 3:
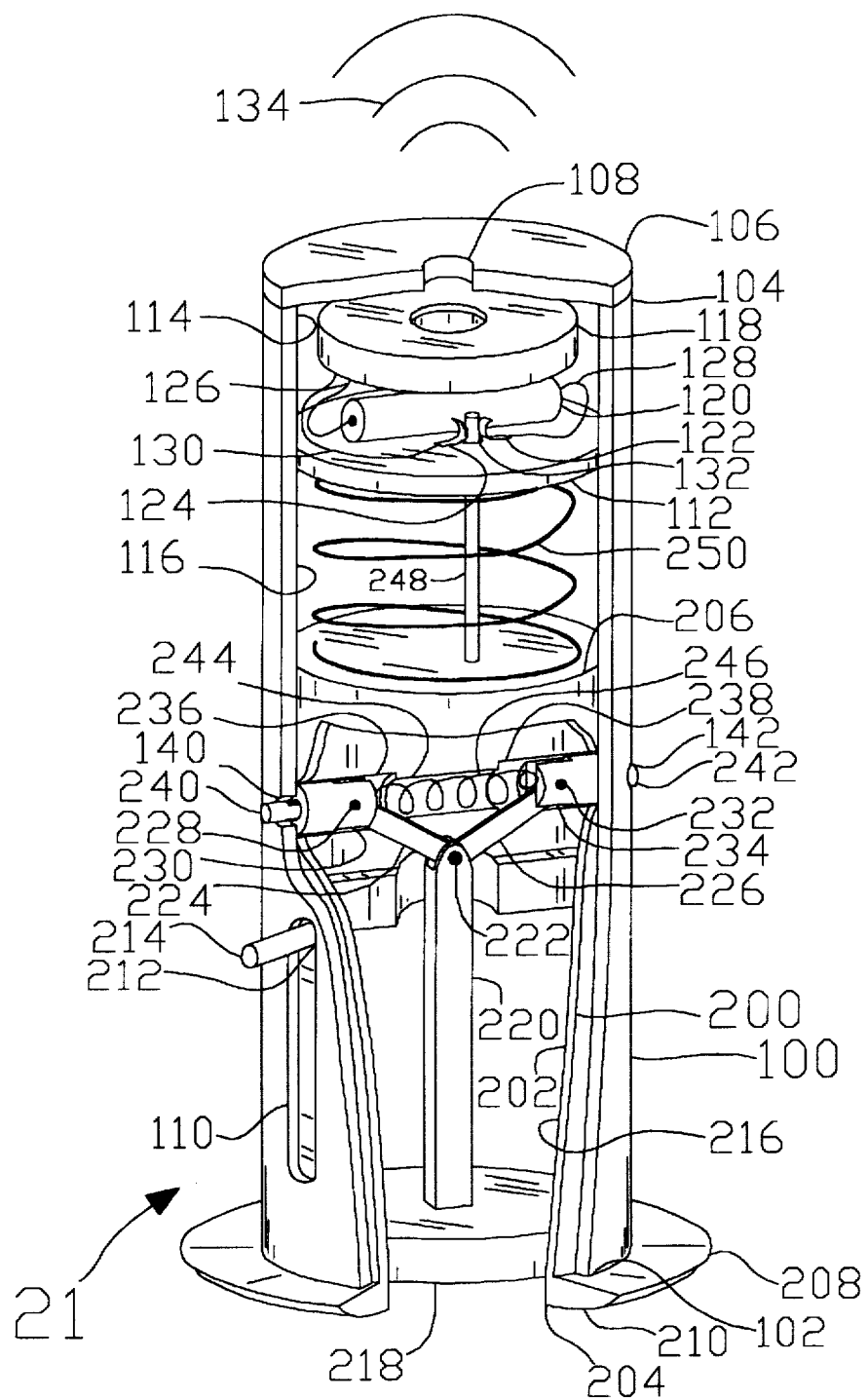
FIG. 3 illustrates a partly broken away perspective view of the brake assembly revealing both the magnetically actuated pin release assembly of the concentrically disposed piston and the alarm circuit.
Figure 4:
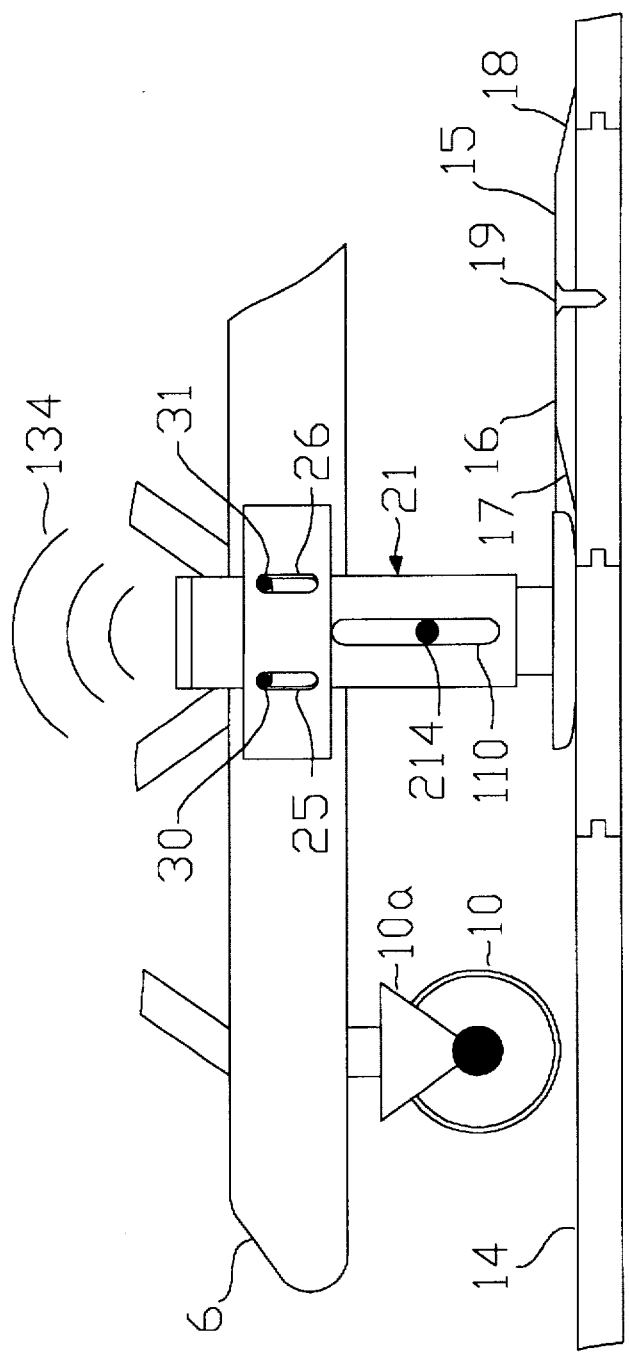
FIG. 4 illustrates a partly broken away partial side view of an embodiment of the invention with the brake assembly fully engaged.

Referring now to FIG. 3, brake assembly 21 consists of a cylindrically shaped outer housing 100. The bottom end 102 of housing 100 is open ended to accept piston 200. Top end 104 of housing 100 is covered with removable top 106 having a centered through hole 108. Further formed on the lower outside surface of housing 100 is vertically disposed through slot 110 and oppositely disposed through holes 140 and 142. Further, partition wall 112 separates the interior space of housing 100 into upper chamber 114 and lower chamber 116.

Referring now to upper chamber 114 of housing 100, upper chamber 114 contains a two terminal audible alarm element 118, battery 120 and a single pole single throw switch composed of contacts 122 and 124.

The negative potential terminal of battery 120 attaches to one end of wire 126. The other end of wire 126 attaches to the negative terminal of alarm element 118. The positive potential terminal of battery 120 attaches to one end of wire 128. The other end of wire 128 attaches to switch contact 122. The positive terminal of alarm element 118 attaches to switch contact 124 via wire 130. Alarm element 118, battery 120 and switch contacts 122 and 124 are thus wired to form a simple series circuit. Hole 108 passes alarm sounds 134 produced by energizied alarm element 118 to the exterior of housing 100.

Switch contacts 122 and 124 are springably affixed to the top surface of partition wall 112 and are preferably made from a copper and beryllium alloy. Switch contacts 122 and 124 are further forceably separated by the upper end of rod 248 which protrudes through hole 132 of partition 112.

Referring now to the lower chamber 116 of housing 100, piston 200 is cylindrically shaped having an outer side wall 202, open bottom end 204 and an enclosed top end 206. Further formed on open end 204 is flange 208 having beveled side edge 210. The inner diameter of housing 100 is larger than the outside diameter of piston 200 thereby providing for minimal frictional contact between the outside surface of wall 202 of piston 200 and the interior surface of housing 100.

Further formed on side wall 202 of piston 200 is tapped hole 212. Guide pin 214 is inserted through open slot 110 of housing 100 and threads into tapped hole 212. The diameter of pin 214 is slightly less than the width of slot 110 thereby allowing pin 214 to move unobstructively within slot 110.

Pin 214 guided within slot 110 affixes the radial position of piston 200 to housing 100 preventing rotation of piston 200 within the interior of housing 100 but allows piston 200 to freely move vertically within housing 100 a distance defined by the vertical length of slot 110.

The lower portion of the interior portion of piston 200 has formed a cylindrically shaped lower chamber 216 which accommodates cylindrically shaped magnet 218. Magnet 218 is positioned above bottom end 204 of piston 200 and is held in place by the lower end of connecting rod 220. The outside diameter of magnet 218 is smaller than the inside diameter of wall 202 of piston 200. Thus magnet 218 can freely move in a vertical position being substantially guided by interior wall of chamber 216.

Pin 222 pivotally connects the upper end of rod 220 to the lower ends of connecting struts 224 and 226. Pin 232 pivotally connects the upper end of strut 226 to the backside of substantially cylindrically shaped release pin 234. Pin 228 pivotally connects the upper end of strut 224 to the backside of substantially cylindrically shaped release pin 230.

Further formed on the outward side of release pins 230 and 234 are respective cylindrically shaped and identical tapered dowels 240 and 242. The maximum diameters of dowels 240 and 242 are respectively less than both the diameters of the release pins 230 and 234 and the diameters of holes 140 and 142.

The upper portion of the interior portion of piston 200 has formed oppositely disposed cylindrically shaped release pin chambers 236 and 238 which further encloses respective release pins 230 and 234. Release pins 230 and 234 can freely move within respective chambers 236 and 238. Cylindrically shaped spring chamber 244 connects chambers 236 and 238. The diameter of chamber 244 is less than the diameter of chambers 236 and 238 and encloses compressed pin spring 246. Compressed spring 246 is axially and moveably positioned within spring chamber 244. The ends of compressed pin spring 246 further engage the backsides of pins 230 and 234. Pins 230 and 234 and respective chambers 236 and 238 along with respective dowels 240 and 242, and additionally chamber 244, along with through holes 140 and 142 of housing 100, are all axially aligned with piston 200 retractably positioned within housing 100.

Compressed pin spring 246 applies an outwardly directed force upon release pins 230 and 234 forcing respective dowels 240 and 242 to protrude through respective side wall holes 140 and 142 of outside housing 100 thus fixing the position of piston 200 with respect to housing 100. Additionally, compressed spring 246 applies a force through struts 224 and 226 to rod 220 which suspends magnet 218 within the lower portion of chamber 216. It is therefore understood that without any additional external force exerted on magnet 218, and with piston 200 forceably inserted into housing 100, pins 230 and 234 are extendably positioned protruding respective dowels 240 and 242 through respective holes 140 and 142 of housing 100 thereby latching piston 200 within housing 100.

Top 206 of piston 200 has further formed a cylindrically shaped and vertically disposed switch contact separator rod 248. With dowels 240 and 242 protruding through respective holes 140 and 142 of housing 100, the upper end of rod 248 protrudes through hole 132 of partition wall 112 forceably separating switch contacts 122 and 124 thus opening the series circuit consisting of battery 120, alarm element 118, and switch contacts 122 and 124.

Additionally with dowels 240 and 242 protruding through respective holes 140 and 142 of housing 100, a vertically disposed spring 250 is compressed between top surface 206 of piston 200 and the bottom surface of partition 112. Compressed spring 250 therefore exerts a downwardly directed force onto piston 200 with respect to housing 100 though vertical movement of piston 200 is prevented because the extended and engaged dowels 240 and 242 counter the downwardly directed force of spring 250. However, with dowels 240 and 242 retracted completely within respective chambers 236 and 238, piston 200 is free to move downwardly and outwardly from housing 100 under the force of spring 250 a maximum distance limited to the vertical length of slot 110.

It is therefore understood from the foregoing discussion that brake assembly 21 is disengaged when dowels 240 and 242 are extendably positioned through respective holes 140 and 142 of housing 100 affixing the position and inhibiting the vertical movement of piston 200 with respect to housing 100, and brake assembly 21 is engaged when dowels 240, and 242 are retractably positioned completely within respective chambers 236 and 238 thereby allowing piston 200 to move in a downward vertical direction with respect to housing 100 under the force of compressed spring 250.

Further, housing 100 and piston 200 are preferably made from any suitable engineering plastic minimizing the cost of brake assembly 21.

In operation and now referring to FIGS. 1 through 4, with brake assembly 21 disengaged walker 5 freely traverses an area of floor surface 14 not bounded by strip 15. The beveled edge 210 of bottom end 204 of brake assembly 21 is maintained in close contact with, and unobstructively slides over, surface 14.

Upon walker 5 approaching open staircase 20 and forwardly passing over strip 15, front wheels 10 and 11 easily roll up over outside beveled edge 18 onto top 16 and down inside beveled edge 17 of strip 15. As walker 5 continues to be propelled towards open staircase 20, beveled edge 210 of brake assembly 21 eventually contacts outside beveled edge 18 of strip 15. Further forward motion of walker 5 towards open staircase 20 causes beveled edge 210 to smoothly ascend along outside beveled edge 18 thereby moving brake assembly 21 vertically with respect to support member 6. Brake assembly 21 is guided by pins 30 and 31 positioned within respective slots 25 and 26 and freely moves in the vertical direction without impeding the forward motion of walker 5.

Continued forward motion of walker 5 towards open staircase 20 positions the entire bottom end 204 of brake assembly 21 over top 16 of strip 15. In this position, the magnetic lines of force of permanent magnet 218 couple to the magnetically permeable strip 15 causing an attractive force between magnet 218 and strip 15. With strip 15 firmly affixed to surface 14, all of the attractive force acts upon moveable magnet 218. Magnet 218 therefore starts to downwardly move towards top 16 substantially guided by the inner wall of chamber 216.

The downward vertical movement of magnet 218 additionally causes downward vertical movement of rod 220. The downward vertical movement of rod 220 causes struts 224 and 226 to pivotally move downwardly and inwardly from their respective positions. The movement of struts 224 and 226 cause respective pins 230 and 234 to move inwardly within respective chambers 236 and 238 thereby compressing spring 246 and eventually causing dowels 240 and 242 to retractably disengage from respective holes 140 and 142 of housing 100. With dowels 240 and 242 completely retracted into respective chambers 236 and 238, piston 200 is now free to move in a vertically downward direction under the force exerted by compressed spring 250. It is therefore understood that a downward movement of magnet 218 acts through rod 220 and struts 224 and 226 to retract respective dowels 240 and 242 unlatching piston 200 from housing 100 and allowing relative vertical movement between piston 200 and housing 100.

The downwardly directed force of spring 250 acting upon the now unlatched piston 200 and with bottom surface 204 in contact with top surface 16 initially pushes housing 100 vertically upwards until pins 30 and 31 contact the upper end of respective slots 25 and 26 which restrains any further vertical movement of housing 100 with respect to member 6. It is understood that with this initial relative vertical displacement between housing 100 and piston 200, dowels 240 and 242 now move vertically downward from, and hence are not axially aligned with, respective holes 140 and 142.

The remaining force of compressed spring 250 is now upwardly exerted from housing 100 to member 6 and downwardly exerted to piston 200 forceably increasing the frictional contact between bottom end 204 and top surface 16. As walker 5 continues to move in the direction of open staircase 20, beveled edge 210 eventually contacts inside beveled edge 17. The force of compressed spring 250 maintains forceable frictional contact between beveled edge 210 and beveled edge 17 further extending piston 200 outwardly from housing 100 as brake assembly 21 moves off of strip 15 and eventually contacts floor surface 14. The force of compressed spring 250 acting through support member 6 and wheel support assemblies 10a and 11a further lifts front wheels 10 and 11 off of surface 14.

With the interior portion of piston 200 passing over top 16 and then down beveled edge 17 of strip 15, the magnetic lines of force attracting magnet 218 to strip 15 diminish and altogether disappear as bottom end 204 eventually contacts surface 14. The downward directed force acting on magnet 218 therefore disappears as brake assembly 21 once again makes contact with surface 14. However, forceable frictional contact between bottom end 204 and surface 14 is still maintained by compressed spring 250 because dowels 240 and 242 have been vertically displaced downwardly from, and are not axially aligned with, respective holes 140 and 142. As piston 200 extends outwardly from housing 100, the radial position of piston 200 with respect to housing 100 is fixed by pin 214 moving in slot 110.

The forceably maintained frictional contact exerted now between bottom end 204 of piston 200 and surface 14, in addition to the lifting of front wheels 10 and 11 front surface 14, arrests walker 5.

Additionally as piston 200 extends outwardly from housing 100, rod 248 moves vertically downward with respect to partition wall 112 eventually enabling contacts 122 and 124 to springably close thereby completing the series circuit between battery 120 and alarm element 118. The now energizied alarm element 118 produces loud audible alarm sounds 134 which pass through hole 108 thereby alerting attentive personnel to the potentially dangerous position of walker 5.

Having arrested walker 5, brake assembly 21 is manually disengaged by pulling vertically upwards on pin 214. This action moves piston 200 upwards within housing 100 compressing spring 250. Further upward movement on pin 214 guided within slot 110 eventually axially aligns dowels 240 and 242 with respective holes 140 and 142. With no magnetic lines of force acting on magnet 218, compressed spring 246 forceably pushes outwardly on pins 230 and 234 extending dowels 240 and 242 through respective holes 140 and 142 again locking piston 200 within housing 100. With piston 200 locked in this upward position, rod 248 forceably seperates contacts 122 and 124 opening the series circuit and deenergizing alarm element 118. Brake assembly 21 is now disengaged and walker 5 can again freely traverse an area of floor surface 14 not bounded by strip 15.

Figure 5:
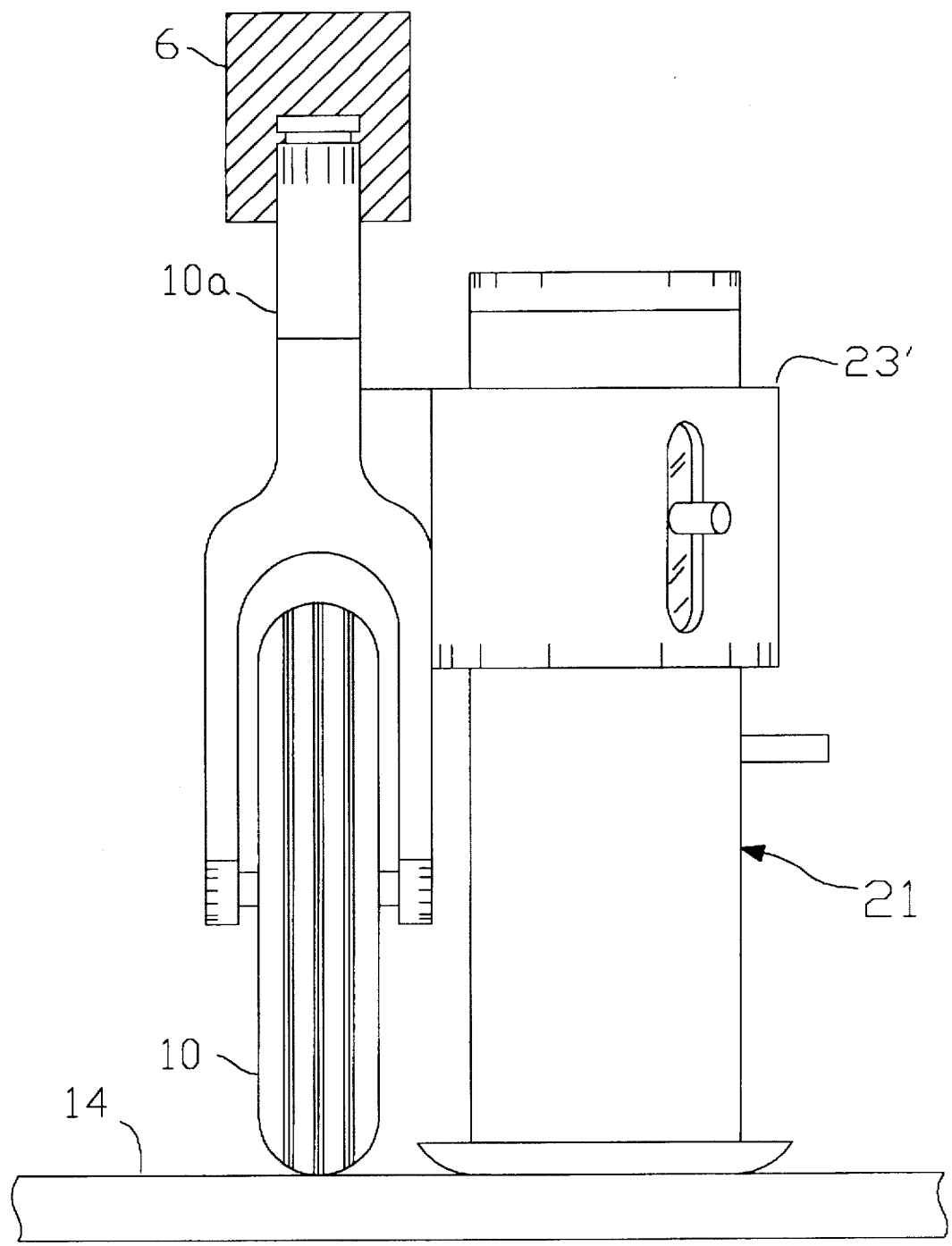
FIG. 5 illustrates a rear view of another embodiment of the invention having the brake assembly moveably attached to a wheel support assembly.

Referring now to FIG. 5, one or more wheel support assemblies 10a, 11a, 12a, or 13a could alternatively have formed cylindrically shaped bracket 23' for moveably attaching brake assembly 21. Bracket 23' serves the same function as bracket 23. It is thus understood that brake assembly 21 could be movably attached to any one or more wheel support assemblies instead of support member 6 without altering the operation thereof.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. A braking apparatus for a mobility device, said mobility device rolling on a surface, said braking apparatus increasing the frictional contact between said mobility device and said surface, said braking apparatus being engaged when said mobility device passes over a magnetically permeable boundary defined on said surface, said braking apparatus comprising:

a piston chamber attached to said mobility device;

a piston springably biased within said chamber;

a moveable magnet attractively responsive to said boundary; and means positioned within said piston for latching said piston within said piston chamber, said latching means releasably responsive to said magnet, wherein when unlatched, said piston is forcibly extended outwardly from said chamber directly engaging said surface.

2. The invention of according to claim 1 wherein said latching means comprises:

a first pin radially positioned within said piston springably engaging said piston chamber and responsive to said magnet; and a second pin oppositely disposed from said first pin, said second pin radially positioned within said piston springably engaging said piston chamber and responsive to said magnet.

\* \* \* \* \*